United States Patent
Wilson et al.

(10) Patent No.: US 6,628,866 B1
(45) Date of Patent: Sep. 30, 2003

(54) OPTICAL FIBER RIBBONS CONTAINING RADIATION CURED ENCAPSULATING MATERIALS

(75) Inventors: Daniel A. Wilson, Cincinnati, OH (US); Paul J. Shustack, Elmira, NY (US); Patrick Vaughn, Fairfield, OH (US)

(73) Assignee: Borden Chemical, Inc., Columbus, OH (US)

(*) Notice: Subject to any disclaimer, the term of this patent is extended or adjusted under 35 U.S.C. 154(b) by 0 days.

(21) Appl. No.: 09/701,609

(22) PCT Filed: Mar. 27, 2000

(86) PCT No.: PCT/US00/08095
§ 371 (c)(1), (2), (4) Date: Feb. 8, 2001

(87) PCT Pub. No.: WO00/60394
PCT Pub. Date: Oct. 12, 2000

Related U.S. Application Data
(60) Provisional application No. 60/127,425, filed on Apr. 1, 1999.

(51) Int. Cl.[7] .................................................. G02B 6/44
(52) U.S. Cl. ........................................................ 385/114
(58) Field of Search .................................. 385/100, 114, 385/115, 127, 128, 141, 147

(56) References Cited

U.S. PATENT DOCUMENTS

| | | |
|---|---|---|
| 5,524,164 A | 6/1996 | Hattori et al. |
| 5,561,730 A | 10/1996 | Lochkovic et al. |
| 5,881,194 A | 3/1999 | Duecker |
| 5,905,835 A * | 5/1999 | Bourghelle et al. ......... 385/114 |

FOREIGN PATENT DOCUMENTS

| | | |
|---|---|---|
| EP | 407004 A | 1/1991 |
| EP | 780712 A | 6/1997 |
| EP | 822432 A | 2/1998 |
| JP | 63-146009 * | 6/1988 |

OTHER PUBLICATIONS

McCreary et al., *International Wire and Cable Symposium Proceedings* (1998); 432–439.

Patent Abstracts of Japan, vol. 012, No. 408 (P–778), Oct. 28, 1988.

* cited by examiner

*Primary Examiner*—Khiem Nguyen
(74) *Attorney, Agent, or Firm*—Dinsmore & Shohl LLP

(57) ABSTRACT

Optical fiber ribbons comprise at least two optical fiber subunit ribbons encapsulated within a radiation cured encapsulating material. The radiation cured encapsulating material allows separation of the subunit ribbons by hand tearing of the encapsulating material and adheres to the subunit ribbon upon twisting of the optical fiber ribbon. The radiation cured encapsulating material preferably has a tear resistance of less than about 2.20 pounds force and an adhesion force to an underlying surface material of greater than about 0.0044 pounds force.

28 Claims, 1 Drawing Sheet

OPTICAL FIBER RIBBONS CONTAINING RADIATION CURED ENCAPSULATING MATERIALS

This application claims the benefit of provisional application No. 60/127,425, filed Apr. 1, 1999.

FIELD OF THE INVENTION

The present invention is directed to optical fiber ribbons containing radiation cured encapsulating materials and is directed to radiation cured materials suitable for use, inter alia, as encapsulating materials for optical fiber ribbons. The radiation cured encapsulating materials have an advantageous combination of physical properties, including a low tear resistance and good adhesion. The radiation cured encapsulating materials in turn provide the optical fiber ribbons with improved reliability and versatility.

BACKGROUND OF THE INVENTION

New optical fiber technologies are continually being developed to accommodate increasing demands for band width and other communication properties. Optical fiber ribbons have been developed to provide increased packing densities, improved accessibility and the like. In the U.S. telecommunications industry, 12-fiber ribbons have become a standard while in Japan, 8-fiber ribbons have commonly been employed. Optical fiber ribbons are disclosed, for example, in the Duecker U.S. Pat. No. 5,881,194, the Lochkovic et al U.S. Pat. No. 5,561,730 and the Hattori et al U.S. Pat. No. 5,524,164, and by McCreary et al, *International Wire and Cable Symposium Proceedings* (1998): 432–439.

Generally, optical fiber ribbons comprise two or more optical fibers embedded and secured within a matrix material. The optical fibers are typically arranged in parallel relation substantially within a single plane. To accommodate increased capacity demands, as many as 24 optical fibers may be arranged in a single linear array in an optical ribbon. In certain applications, it is desirable to separate the optical fiber ribbon into two or more subunits by splitting the optical ribbon. To allow such separation, it has been a common practice to provide the optical fibers which are positioned at the ends of adjacent subunits in side-by-side direct contact with each other, without matrix material therebetween. This arrangement offers a convenient separating mechanism for splitting the optical fiber ribbon into subunits. However, owing to the small size of the individual fibers, their close proximity to one another, and/or the properties of the matrix materials, reliable splitting of the ribbon into subunits has been difficult as uneven tearing or splitting and/or optical fiber damage often results.

Several alternatives have been suggested to provide optical fiber ribbons which may be more reliably split into subunit ribbons. For example, notches have been provided in optical fiber ribbons along the desired tear or split line. In practice, the notches provided a weak area in the ribbon structure and have caused various problems with the handling integrity of the ribbons. Another alternative has been to provide modular subunits in an optical fiber ribbon. In this design, individual subunits are formed by embedding and securing a number of optical fibers in a matrix material. Two or more subunits are then embedded in an encapsulant material to form the optical fiber ribbon containing the modular subunit ribbons. For example, Hattori et al disclose optical fiber ribbon containing two modular subunit ribbons, each of which contains four optical fibers. The subunit ribbons are embedded and secured within an encapsulating material. Similarly, McCreary et al disclose a 24-fiber modular optical fiber ribbon which contains two 12-fiber subunit ribbons. The subunit ribbons are embedded within an encapsulating material to form the 24-fiber optical fiber.

While the modular type optical fiber ribbon containing subunit ribbons provide improvement over nonmodular optical fiber ribbons in various applications, the modular optical fiber ribbons typically exhibit one or more deficiencies in use. For example, during tearing or splitting of the modular subunits, uneven tear often occurs, resulting in overhang of the encapsulating matrix on one split subunit ribbon and excessive removal of encapsulating material on an adjacent subunit ribbon. The uneven tear or splitting of the encapsulating material can be particularly disadvantageous when the encapsulating material is provided with printed identification information and such information is removed from one of the subunits by uneven tearing. Previous modular optical fiber ribbons have also been known to exhibit delamination of the encapsulating material from the subunits, particularly upon the twisting of the optical fiber ribbons which is conventionally encountered in cabling applications. In yet additional modular optical fiber ribbons, cracking of the encapsulating material has occurred. Accordingly, the need remains for providing improved modular optical fiber ribbons which allow for reliable and even splitting of subunits therefrom and which exhibit improved handling robustness and resist cracking or delamination of the encapsulating material.

SUMMARY OF THE INVENTION

Accordingly, it is an object of the present invention to provide optical fiber ribbons, and particularly to provide optical fiber ribbons of the modular type wherein two or more subunit ribbons are encapsulated within an encapsulating material. It is an additional object of the present invention to provide optical fiber ribbons which overcome disadvantages of the prior art. It is a more specific object of the invention to provide optical fiber ribbons which allow reliable tearing or splitting of subunit ribbons and which exhibit robust handling properties and resist cracking and/or delamination of the encapsulating material. It is a further object of the invention to provide radiation cured encapsulating materials for use, inter alia, in modular optical fiber ribbons.

These and additional objects are provided by the optical fiber ribbons and encapsulating materials of the present invention. More particularly, the invention is directed to radiation cured encapsulating materials having a low tear resistance and good adhesion to an underlying surface. In a more specific embodiment, the encapsulating materials exhibit a tear resistance of less than about 2.20 pounds force and an adhesion force to an underlying surface of greater than about 0.0044 pounds force. In further preferred embodiments, the encapsulating material has a percent elongation at break of at least about 5% and a Young's modulus at 25° C. of at least about 1,000 psi. The present invention is also directed to optical fiber ribbons which comprise at least two optical fiber subunit ribbons encapsulated within a radiation cured encapsulating material, wherein the radiation cured encapsulating material has a low tear resistance which allows the subunit ribbons to be separated by hand, i.e., the ribbons exhibit hand separability of the subunit ribbons, and has robust handling properties, whereby the ribbons resist delamination and cracking when subjected to twisting. In a more specific embodiment, the optical fiber ribbons include an encapsulating material having a tear resistance of less than about 2.20 pounds force and an adhesion force to an outer surface of each subunit of greater than about 0.0044 pounds force. Preferably, the radiation cured encapsulating material in which the optical fiber subunit ribbons are encapsulated has a percent elongation at break of at least about 5% and a Young's modulus at 25° C. of at least about 1,000 psi.

The optical fiber ribbons according to the present invention are advantageous in that they allow reliable tearing or splitting of subunit ribbons therefrom, even by hand, resulting in even tear and preventing overhang or excessive removal of the encapsulating material in the individual split subunits. Additionally, the optical fiber ribbons of the invention exhibit robust handling properties and may be twisted in cabling environments without cracking of the encapsulating material or delamination of the encapsulating material from the subunit ribbons.

These and additional objects and advantages provided by the optical fiber ribbons and encapsulating materials of the present invention will be more fully apparent in view of the following detailed description.

BRIEF DESCRIPTION OF THE DRAWING

The following detailed description will be more fully understood in view of the drawing in which.

DETAILED DESCRIPTION

The present invention is directed to optical fiber ribbons and to radiation cured encapsulating materials for use, inter alia, in optical fiber ribbons. Preferably, the optical fiber ribbons according to the present invention are of the modular type and include at least two optical fiber subunit ribbons encapsulated within a radiation cured encapsulating material. The optical fiber ribbons may comprise two, three, four, or more subunit ribbons as is desired for a particular application. Each optical fiber subunit ribbon in turn preferably comprises two or more optical fibers embedded and encapsulated within a matrix material. While subunit ribbons comprising four, eight and twelve optical fibers, respectively, are commonly employed, the number of optical fibers in a particular subunit ribbon may be varied as desired.

Figure 1:
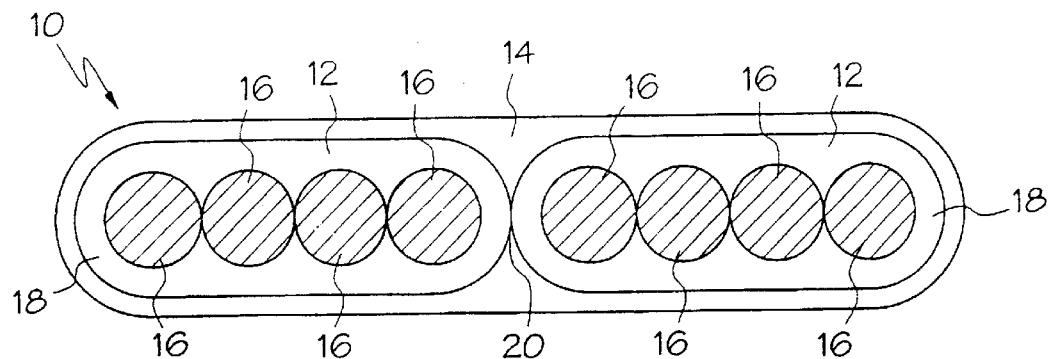
FIG. 1 sets forth one embodiment of the optical fiber ribbons of the invention comprising 8 optical fibers arranged in two subunit ribbons encapsulated within a radiation cured encapsulating material.
Figure 2:
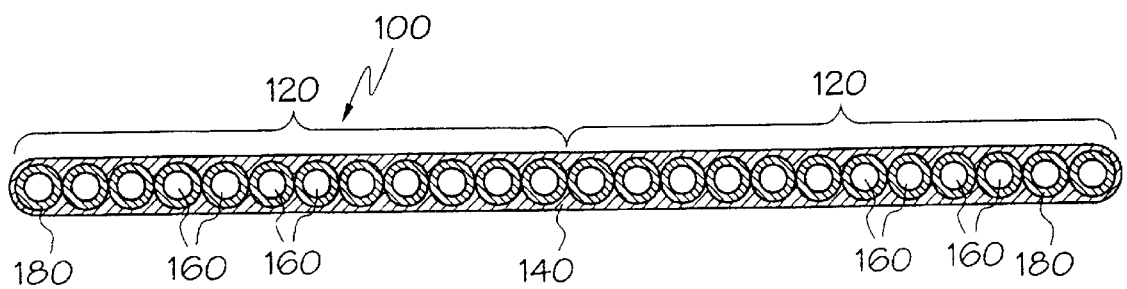
FIG. 2 sets fourth a another embodiment of the optical fiber ribbons of the invention comprising 24 optical fibers arranged in two subunit ribbons encapsulated within a radiation cured encapsulating material.

Typical optical fiber ribbons in accordance with the present invention are shown in FIGS. 1 and 2. Specifically, FIG. 1 is directed to an optical fiber ribbon 10 which comprises two subunit ribbons 12 encapsulated within an encapsulating material 14. Each subunit ribbons comprises four optical fibers 16 embedded within matrix material 18. Although it is preferred that adjacent subunit ribbons 12 are in contact with one another at their adjacent edges as shown at 20 in FIG. 1, it is equally within the scope of the invention to space adjacent subunit ribbons from one another so that encapsulating material 14 separate the adjacent subunits and prevents the adjacent subunit ribbons from contacting one another.

Another embodiment of optical fiber ribbons according to the present invention is set forth in FIG. 2. In this embodiment, the optical fiber ribbon 100 comprises two subunits indicated at 120. The subunits 120 are encapsulated within encapsulating material 140. Each subunit 120 contains twelve optical fibers 160 embedded and secured within a matrix 180. The encapsulating material 140 is a thin layer relative to the thickness of the subunit matrix material. Those skilled in the art will recognize that the thickness of the encapsulating material relative to the subunit may be varied as desired. In a typical embodiment, the thickness of the encapsulating material may be on the order of from about 1 to about 50 microns, preferably from about 5 to about 25 microns.

Typically, the optical fibers in each subunit of the optical fiber ribbons of the present invention are arranged in parallel fashion and substantially within a single plane as shown in FIGS. 1 and 2. However, it is equally within the scope of the present invention to arrange the optical fibers in other configurations as desirable.

The structure, composition and manufacture of the individual optical fibers 16 is well known in the art. For example, the optical fibers may be provided with one or more primary coatings and/or secondary coatings in accordance with techniques known in the art to protect the underlying glass fiber from external damaging forces and/or to improve the performance of the optical fibers. Additionally, the optical fibers may include ink coloring as desired. In a preferred arrangement, each fiber of a subunit ribbon is provided with a different and distinguishing color.

Matrix materials suitable for use in the subunit ribbons are also known in the art. Attention is directed to the Duecker U.S. Pat. No. 5,881,194 which discloses suitable matrix materials and which is incorporated herein by reference. Other matrix materials known in the art are also suitable for use in the optical fiber subunit ribbons.

In accordance with an important feature of the optical fiber ribbons of the invention, the optical fiber subunit ribbons are encapsulated in a radiation cured encapsulating material having low tear resistance which allows the subunit ribbons to be separated by hand, and having good adhesion to the underlying surfaces of matrix material. Preferably, the encapsulating material has a tear resistance of less than about 2.20 pounds force and an adhesion force to an outer surface of each subunit of greater than 0.0044 pounds force. This combination of properties provides improved even tearing of the ribbon to obtain separate individual subunits. This combination of properties also provides robust handling properties to the optical fiber ribbon. In preferred embodiments, the radiation cured encapsulating material further has a percent elongation at break of at least about 5% and a Young's modulus at 25° C. of at least about 1,000 psi to further improve the handling properties of the optical fiber ribbons.

The tear resistance of the encapsulating material refers to the maximum tear resistance force and is measured in accordance with ASTM D 1004-66, *Standard Test Method for Initial Tear Resistance of Plastic Film and Sheeting*, which is incorporated herein by reference. This method determines the tear resistance of flexible plastic film and sheeting at very low rates of loading and measures the force required to initiate tearing. The test film comprises a cured film having a thickness of about 0.006–0.007 inch (about 150–175 micron thickness). A suitable curing unit for curing the film comprises a Fusion Systems or other comparable curing unit capable of producing either ultraviolet or electron beam radiation. The dose used to cure the film should be about 0.7 joules/cm$^2$. The encapsulating materials employed in the present invention, when cured, have a tear resistance of less than about 2.20 pounds force, and preferably of less than about 1.10 pounds force, and more preferably less than about 0.44 pounds force.

Additionally, the radiation cured encapsulating material also exhibits an adhesion force to an underlying surface material on which it is cured, for example the outer surface of a subunit ribbon, of greater than about 0.0044 pounds force, preferably greater than about 0.011 pounds force, and more preferably greater than about 0.015 pounds force. Adhesion force as employed in the present specification and claims is measured using the following procedure. A substrate matrix film is first prepared by pouring a sample of a substrate matrix liquid on a 0.25 inch thick glass plate. A film applicator capable of producing a film thickness of approximately 0.006 inches (approximately 150 microns) and a width of at least 5 inches is employed. The plate is either placed in a closed apparatus for purging the oxygen therein down to less than 70 ppm or is placed in a curing unit which has been previously purged to less than 70 ppm oxygen. A suitable curing unit comprises a Fusion Systems or other comparable curing unit capable of producing either ultraviolet or electron beam radiation. The dose used to cure the film should be about 0.7 joules/cm$^2$. The resulting cured substrate film is trimmed longitudinally by approximately 1/8 of an inch on both sides, with care being taken not to completely delaminate the film from the surface of the glass. The liquid encapsulating material is then poured on top of the substrate film and, using the same film applicator, a film of the encapsulating material is prepared on top of the substrate film. The encapsulating film should be approximately 0.003 inches (approximately 75 microns) in thickness, and is cured under the same conditions as employed for the curing of the substrate film. The resulting cured film sandwich is removed from the glass plate and conditioned for at least 16 hours at 23±2° C. and 50±10% relative humidity. After this conditioning, two 1-inch strips are cut lengthwise on a sample cutter which provides cut films of a 1-inch width by at least eight inch length. The strips should be cut at least 1/4 inch from the edges of the film with at least 1/4 inch between them. An Instron or similar tensile testing machine equipped with a software package capable of calculating an average load experienced during testing is used to measure the force necessary to separate the two materials. The cut film strip should be trimmed to a length of about 7.5 inches, and the top layer is peeled off the substrate from the bottom to the top of the film, the top being the area where the liquid was poured to form the film, until approximately 4 inches remain unseparated. This 4-inch section is used as the test section. The peeled layer of encapsulating material is secured in the upper grip of the Instron and the exposed substrate tab is secured to the lower grip. The strip should be in line with the two grips and the test portion should not touch the upper grip. Instron settings comprising a gauge length of 3.25 inches, crosshead speed of 20 mm/min, and linear test distance of 1.5 inches are employed. During the test, the software program calculates the average load experienced during separation of the two layers. The load experienced will increase to a certain value and then remain relatively constant producing a plateau in the load versus extension curve. The average load is calculated between the initial portion of this plateau region and the end of the linear test distance. The calculated load for two strips is averaged and reported as the adhesion force.

Radiation cured encapsulating materials having the aforementioned combination of tear resistance and adhesion provide the optical fiber ribbons with even, reliable tearing of subunit ribbons therefrom, and exhibit robust handling properties. In additional embodiments, the radiation cured encapsulating material further has a percent elongation at break of at least about 5%, preferably at least about 10%, and more preferably at least about 20%. The percent elongation at break is also measured according to ASTM D 882-95a.

In yet further embodiments, the radiation cured encapsulating material has a Young's modulus at 25° C. of at least about 1000 psi, and more preferably of at least about 3000 psi. It is preferred that the modulus is not greater than about 100,000 psi, and in certain embodiments is preferred to be in the range of from about 1,000 to about 50,000 psi, preferably in the range of from about 3,000 to about 25,000 psi, and more preferably in the range of from about 3,000 to about 15,000 psi. The modulus is measured according to ASTM D 882-95a, *Standard Test Method for Tensile Properties of Thin Plastic Sheeting*, which is incorporated herein by reference.

In preferred embodiments wherein the optical fiber ribbons exhibit reliable even tear properties and particularly robust handling properties, the radiation cured encapsulating material preferably has a tear resistance of less than about 1.10 pounds force, a Young's modulus at 25° C. in the range of from about 3,000 to about 25,000 psi, a percent elongation at break of at least about 10%, and an adhesion force to an outer surface material of each subunit ribbon of greater than about 0.011 pounds force. More preferably, the radiation cured encapsulating material has a tear resistance of less than about 0.44 pounds force, a Young's modulus at 25° C. in the range of from about 3,000 to about 15,000 psi, a percent elongation at break of at least about 20%, and an adhesion force to an outer surface material of each subunit ribbon of greater than about 0.015 pounds force. Such optical fiber ribbons exhibit particularly good resistance to delamination from subunit ribbons and to encapsulating material cracking, even when the optical fiber ribbons are subjected to excessive twisting and the like.

The encapsulating material employed in the optical fiber ribbons of the present invention is radiation curable in order to facilitate production of the ribbons in accordance with conventional optical fiber ribbon manufacturing techniques. The radiation cured encapsulating materials are formed by radiation curing compositions comprising radiation curable monomers and oligomers and an effective amount of a photoinitiator for radiation curing the composition upon exposure to curing radiation, for example ultraviolet radiation, or the like. In a preferred embodiment, the compositions from which the radiation cured encapsulating material is formed comprise a urethane acrylate or methacrylate oligomer, preferably a polyether-based urethane acrylate oligomer or a polyester-based urethane acrylate oligomer, an acrylated acrylic or methacrylic oligomer, an epoxy acrylate or methacrylate oligomer, or mixtures thereof. These oligomers are commercially available from various sources. Examples of commercially available materials are Ebecryl® 4842, a silicone-modified polyether aliphatic urethane diacrylate oligomer, Ebecryl® 270, a polyether aliphatic urethane diacrylate oligomer, and Ebecryl® 1701, an acrylated acrylic oligomer, all of which are available from the Radcure unit of UCB Chemicals Corp., Smyrna, Ga., CN 963, 965 and 966, polyester urethane acrylate oligomers available from Sartomer, CN 816, 817 and 818, acrylated acrylic oligomers available from Sartomer, and CN 120 and UVE 150, epoxy acrylate oligomers available from Sartomer and Croda Resins, respectively. More preferably, the compositions comprise urethane acrylate oligomer, and further preferably comprises a polyalkylene glycol-based urethane acrylate oligomer, and polypropylene glycol-based urethane acrylate oligomers are particularly preferred.

The compositions further comprise at least one monomer having a plurality, i.e., two or more, of acrylate and/or methacrylate moieties for increasing the modulus of the composition to at least the lower level of about 1,000 psi. The monomer may comprise a diacrylate or dimethacrylate, a triacrylate or trimethacrylate, a tetraacrylate or tetramethacrylate, or even a pentaacrylate or pentamethacrylate, or mixtures thereof. Such monomers are well known in the art and include, but are not limited to, alkanediol diacrylates, alkanediol dimethacrylates, alkoxylated derivatives thereof, trimethyloyl propane triacrylate, alkoxylated derivates thereof, glycerol alkoxytriacrylates, pentaerythritol-containing acrylates such as pentaerythritol tetraacrylate and dipentaerythritol monohydroxypentacrylate, neopentyl glycol diacrylate, isocyanurate di- and triacrylate components, cyclohexane dimethanol diacrylates and dimethacrylates, alkoxylated derivatives thereof, bisphenol-A diacrylates and dimethacrylates, alkoxylated derivatives thereof, melamine acrylate and methacrylate derivatives, tricyclodecane dimethanol diacrylate, alkoxylated derivatives thereof, polyether acrylates and methacrylates, and the like, and mixtures thereof. In a preferred embodiment, the monomer comprises an isocyanurate monomer. More preferably, the monomer having a plurality of acrylate and/or methacrylate moieties comprises a triacrylate or a trimethacrylate of an isocyanurate compound. Trifunctional monomers, and particularly a triacrylate of trishydroxyethyl isocyanurate, are preferred.

The radiation curable compositions further comprise a photoinitiator for curing the composition upon exposure to curing radiation. Numerous photoinitiators suitable for use in the compositions are known in the art. The compositions according to the present invention are advantageously UV curable. Examples of photoinitiators suitable for use in the compositions of the present invention include, but are not limited to, benzoin or alkyl ethers thereof such as the benzophenones, phenyl methyl ketone (acetophenone), substituted acetophenones, anthraquinones, polynuclear quinones, aryl phosphine oxides, disulfides or benzil. In a preferred embodiment, the photoinitiator comprises benzophenone, a substituted or unsubstituted acetophenone, or a mixture thereof, and more preferably comprises a substituted acetophenone.

The oligomer, monomer and photoinitiator may be combined in amount sufficient to provide the desired tear resistance and modulus upon curing of the composition. In a preferred embodiment, the radiation curable composition from which the encapsulating material is formed comprise from about 30 to about 80 weight percent of a polyether-based urethane acrylate oligomer, from about 1 to about 40 weight percent of a monomer having a plurality of acrylate or methacrylate moieties, and an effective amount of a photoinitiator for radiation curing the composition upon exposure to curing radiation. In further preferred embodiments, the compositions from which the encapsulating material is formed comprise from about 40 to about 75 weight percent, and more preferably from about 50 to about 70 weight percent, of the polyether-based urethane acrylate oligomer, from about 10 to about 30 weight percent, and more preferably from about 15 to about 25 weight percent, of the monomer having a plurality of acrylate or methacrylate moieties, and from about 0.1 to about 20 weight percent, more preferably from about 1 to about 10 weight percent, of the photoinitiator.

The radiation curable compositions may further include one or more components or additives conventionally employed in radiation curable compositions. For example, the compositions may further comprise a viscosity-reducing component in an amount sufficient to lower the viscosity of the composition. Various viscosity-reducing components are well known in the art and are suitable for use in the radiation-curable compositions for forming the encapsulating materials. Examples of such components include, but are not limited to, linear and branched hydrocarbon acrylates and methacrylates, for example stearyl acrylate; stearyl methacrylate; isooctyl acrylate; isooctyl methacrylate; lauryl acrylate; lauryl methacrylate; caprolactone acrylate; caprolactone methacrylate; decyl acrylate; decyl methacrylate; isodecyl acrylate; isodecyl methacrylate; isobornyl acrylate; isobornyl methacrylate; alkoxylated nonylphenol acrylates and methacrylates, dicyclopentenyloxyethyl acrylate and methacrylate, tert-butyl-cyclohexyl acrylates and methacrylates, 2-phenoxy ethyl acrylates and methacrylates, alkoxylated derivatives thereof, urethane monoacrylates, including, but not limited to, the reaction product of butyl isocyanate and hydroxy ethyl acrylate, and mixtures thereof. Of the above, those having straight chain alkyl groups of from 12 to 18 carbon atoms are preferred. This component may also be used to further reduce the tear resistance of the cured composition or to improve the adhesion of the cured composition to an underlying substrate and, if employed, is included in the radiation-curable composition in an amount sufficient to lower the viscosity of the composition and/or to provide such improvements to the cured composition. Suitably, this component is included in an amount of up to about 30 weight percent, and preferably in an amount of from about 5 to about 15 weight percent.

Additional adhesion promoters for further improving the adhesion of the encapsulating material to the subunit ribbon matrix materials may also be employed if desired. Examples of suitable adhesion promoters include, but are not limited to, organic acid derivatives, for example, beta-carboxy ethyl acrylate, and organo alkoxy silanes, titanates and zirconates. These compounds are suitably employed in amounts up to about 5 weight percent.

A further optional component for use in the radiation-curable compositions comprises a component for reducing the coefficient of friction of the cured encapsulating material and/or for improving wetting of the encapsulating material to an underlying substrate. Various components are known in the art for reducing the coefficient of friction and/or improving the wetting of cured materials and are suitable for use in the radiation-curable compositions. Examples of such components include, but are not limited to, silicon compounds, for example silicone acrylates or other polyorganosiloxane materials, fluorocarbons, waxes and the like. Such components are suitably employed in an amount of up to about 5 weight percent and more preferably in an amount of from about 0.01 to about 3 weight percent.

The radiation-curable compositions may also include various stabilizers to improve shelf life of the uncured compositions and/or to increase thermal and oxidative stability of the cured compositions. Examples of suitable stabilizers include tertiary amines such as diethylethanol amine and trihexylamine, hindered amines, organic phosphates, hindered phenols, mixtures thereof, and the like. Examples of antioxidants which are particularly suitable for use in the compositions include, but are not limited to, octadecyl-3-(3',5'-di-tert-butyl-4'-hydroxyphenyl) propionate; thiodiethylene bis (3,5-di-tert-butyl-4-hydroxy) hydrocinnamate; and tetrakis [methylene (3,5-di-tert-butyl- 4-hydroxyhydrocinnamate)] methane. When a stabilizer is used, it may be incorporated in an amount from about 0.1 percent to about 3 weight percent. Preferably it is included in the range from about 0.25 percent to about 2 weight percent. A preferred stabilizer is thiodiethylene bis (3,5-di-tert-butyl-4'-hydroxy) hydrocinnamate, such as Irganox 1035, from Ciba-Geigy Corporation, Ardsley, N.Y.

The optical fiber ribbons according to the present invention are generally prepared in accordance with techniques known in the art. Broadly, coated and inked fibers are arranged in a desired configuration, preferably substantially planar and parallel, a matrix composition is applied about the fibers, and the matrix composition is cured to form a subunit ribbon. The radiation curable composition for forming the encapsulating material is then applied to two or more subunits arranged in a desired configuration, preferably substantially planar and parallel, and cured to form the modular optical fiber ribbon according to the present invention.

Although the radiation-cured encapsulating materials have been discussed herein for use in optical fiber ribbons, one of ordinary skill in the art will appreciate that these compositions may be useful in any embodiment where it is desirable to coat or bind a flexible substrate. Examples of such substrates include, but are not limited to, glass, metal or plastic.

The following examples exemplify specific embodiments of the materials and optical fiber ribbons of the present invention. Throughout the examples and the present specifications, parts and percentages are by weight unless otherwise specified.

EXAMPLE 1

In this example, a radiation curable composition is prepared comprising about 75.1 parts by weight of a silicone modified polyether aliphatic urethane diacrylate supplied under the commercial designation Ebecryl® 4842, about 4.5 parts by weight of a photoinitiator comprising 1-hydroxycyclohexyl phenyl ketone supplied under the commercial designation Irgacure 184, and about 20.4 parts by weight of triacrylate trishydroxyethyl isocyanurate. The composition is cured by exposure to ultraviolet radiation (0.7 joules/cm$^2$). The composition exhibits low tear resistance and high adhesion within the ranges of the present invention. Similar compositions are prepared wherein a non-silicone modified polyether aliphatic urethane diacrylate supplied under the commercial designation Ebecryl® 270 was employed in place of the Ebecryl® 4842. The resulting cured compositions similarly exhibit a good combination of low tear resistance and high adhesion within the ranges of the present invention.

EXAMPLE 2

In this example, a radiation curable composition comprising the following components in the indicated parts by weight was prepared:

| Component | Parts by Weight |
|---|---|
| Ebecryl ® 4842 | 61.5 |
| Trifunctional polyether acrylate | 28.0 |
| Irgacure 184 | 4.0 |
| Caprolactone acrylate | 5.0 |
| Irganox 1035 | 1.0 |
| Silicone acrylate cof reducer | 0.5 |

The composition was formed into films (6 mil draw down) and cured with ultraviolet radiation (0.7 J/cm$^2$). The resulting cured films were conditions for at least 16 hr at 23±2° C. and 50±5% relative humidity, cut to size and subjected to measurement of the tear resistance according to ASTM D-1004-66. The tear resistance of the films was as follows:

| Sample | Film Thickness (mils) | Tear Resistance (lb-force) |
|---|---|---|
| 1 | 6.3 | 0.280 |
| 2 | 6.3 | 0.302 |

Thus, the cured materials exhibited low tear resistance. The cured materials were also subjected to measurement of adhesion force according to the procedures described above and exhibited an adhesion force to a standard subunit ribbon urethane acrylate-based matrix material of about 0.028 pounds force.

The present examples and specific embodiments set forth in the present specification are provided to illustrate various embodiments of the invention and are not intended to be limiting thereof. Additional embodiments within the scope of the present claims will be apparent to one of ordinary skill in the art.

What is claimed is:

1. An optical fiber ribbon, comprising at least two optical fiber subunit ribbons encapsulated within a radiation cured encapsulating material, wherein the radiation cured encapsulating material is adapted to allow even separation of the subunit ribbons by hand tearing of the encapsulating material and is adapted to adhere to the subunit ribbons upon twisting of the optical fiber ribbon.

2. An optical fiber ribbon, comprising at least two optical fiber subunit ribbons encapsulated within a radiation cured encapsulating material, wherein the radiation cured encapsulating material is adapted to allow separation of the subunit ribbons by hand tearing of the encapsulating material and is adapted to adhere to the subunit ribbons upon twisting of the optical fiber ribbon, and further wherein the radiation cured encapsulating material has a tear resistance of less than about 2.20 pounds force and an adhesion force to an outer surface material of each subunit ribbon of greater than about 0.0044 pounds force.

3. An optical fiber ribbon as defined by claim 1, wherein the radiation cured encapsulating material has a percent elongation at break of at least about 5% and a modulus at 25° C. of at least about 1000 psi.

4. An optical fiber ribbon as defined by claim 1, wherein the radiation cured encapsulating material has a tear resistance of less than about 1.10 pounds force.

5. An optical fiber ribbon as defined by claim 1, wherein the radiation cured encapsulating material has a tear resistance of less than about 0.44 pounds force.

6. An optical fiber ribbon as defined by claim 1, wherein the radiation cured encapsulating material has a modulus at 25° C. of at least about 3000 psi.

7. An optical fiber ribbon as defined by claim 1, wherein the radiation cured encapsulating material has a modulus at 25° C. in the range of from about 3000 to about 50,000 psi.

8. An optical fiber ribbon as defined by claim 1, wherein the radiation cured encapsulating material has a modulus at 25° C. in the range of from about 3000 to about 25,000 psi.

9. An optical fiber ribbon as defined by claim 1, wherein the radiation cured encapsulating material has a percent elongation at break of at least about 5%.

10. An optical fiber ribbon as defined by claim 1, wherein the radiation cured encapsulating material has a percent elongation at break of at least about 10%.

11. An optical fiber ribbon as defined by claim 1, wherein the radiation cured encapsulating material has a percent elongation at break of at least about 20%.

12. An optical fiber ribbon as defined by claim 1, wherein the radiation cured encapsulating material has an adhesion force to an outer surface material of each subunit ribbon of greater than about 0.0044 pounds force.

13. An optical fiber ribbon as defined by claim 1, wherein the radiation cured encapsulating material has an adhesion force to an outer surface material of each subunit ribbon of greater than about 0.011 pounds force.

14. An optical fiber ribbon as defined by claim 1, wherein the radiation cured encapsulating material has an adhesion force to an outer surface material of each subunit ribbon of greater than about 0.015 pounds force.

15. An optical fiber ribbon, comprising at least two optical fiber subunit ribbons encapsulated within a radiation cured encapsulating material, wherein the radiation cured encapsulating material is adapted to allow separation of the subunit ribbons by hand tearing of the encapsulating material and is adapted to adhere to the subunit ribbons upon twisting of the optical fiber ribbon, and further wherein the radiation cured encapsulating material has a tear resistance of less than about 1.10 pounds force, a modulus at 25° C. of at least about 3000 psi, a percent elongation at break of at least about 10%, and an adhesion force to an outer surface material of each subunit ribbon of greater than about 0.011 pounds force.

16. An optical fiber ribbon as defined by claim 1, wherein the radiation cured encapsulating material has a tear resistance of less than about 0.44 pounds force, a modulus at 25° C. in the range of from about 3000 to about 15,000 psi, a percent elongation at break of at least about 20%, and an adhesion force to an outer surface material of each subunit ribbon of greater than about 0.015 pounds force.

17. An optical fiber ribbon as defined by claim 1, wherein each subunit comprises at least two optical fibers embedded and secured within a matrix material.

18. An optical fiber ribbon as defined by claim 17, wherein each subunit comprises about twelve optical fibers.

19. An optical fiber ribbon as defined by claim 1, comprising two subunit ribbons, wherein each subunit ribbon comprises at least two optical fibers embedded and secured within a matrix material.

20. An optical fiber ribbon as defined by claim 19, wherein each subunit ribbon comprises about twelve optical fibers.

21. An optical fiber ribbon as defined by claim 20, wherein the optical fibers of each subunit ribbon are arranged substantially within a single plane.

22. An optical fiber ribbon as defined by claim 1, wherein the radiation cured encapsulating material is formed by radiation curing a composition comprising from about 30 to about 80 weight percent of a polyether-based urethane acrylate oligomer, from about 1 to about 40 weight percent of monomer having a plurality of acrylate or methacrylate moieties, and an effective amount of a photoinitiator for radiation curing the composition upon exposure to curing radiation.

23. An optical fiber ribbon as defined by claim 22, wherein the radiation cured encapsulating material is formed by radiation curing a composition comprising from about 40 to about 75 weight percent of the polyether-based urethane acrylate oligomer, from about 10 to about 30 weight percent of the monomer having a plurality of acrylate or methacrylate moieties, and from about 0.1 to about 20 weight percent of the photoinitiator.

24. An optical fiber ribbon as defined by claim 22, wherein the radiation cured encapsulating material is formed by radiation curing a composition comprising from about 50 to about 70 weight percent of the polyether-based urethane acrylate oligomer, from about 15 to about 25 weight percent of the monomer having a plurality of acrylate or methacrylate moieties, and from about 1 to about 10 weight percent of the photoinitiator.

25. An optical fiber ribbon as defined by claim 22, wherein the polyether-based urethane acrylate oligomer comprises a polypropylene glycol-based urethane acrylate oligomer.

26. An optical fiber ribbon as defined by claim 22, wherein the monomer having a plurality of acrylate or methacrylate moieties comprises a triacrylate or a trimethacrylate of an isocyanurate.

27. An optical fiber ribbon as defined by claim 22, wherein the composition further comprises a viscosity-reducing component in an amount sufficient to lower the viscosity of the composition.

28. An optical fiber ribbon as defined by claim 22, wherein the composition further comprises a coefficient of friction reducing component in an amount sufficient to lower the coefficient of friction of the radiation cured encapsulating material.

* * * * *